(12) United States Patent
Tasaki et al.

(10) Patent No.: US 7,288,242 B2
(45) Date of Patent: Oct. 30, 2007

(54) LITHIUM-CONTAINING COMPLEX OXIDE AND METHOD OF PRODUCING SAME

(75) Inventors: Hiroshi Tasaki, Ibaraki (JP); Yoshio Kajiya, Ibaraki (JP)

(73) Assignee: Nikko Materials Co., Ltd., Tokyo (JP)

( * ) Notice: Subject to any disclaimer, the term of this patent is extended or adjusted under 35 U.S.C. 154(b) by 203 days.

(21) Appl. No.: 10/510,800

(22) PCT Filed: Jan. 15, 2003

(86) PCT No.: PCT/JP03/00249

§ 371 (c)(1),
(2), (4) Date: Oct. 7, 2004

(87) PCT Pub. No.: WO03/084873

PCT Pub. Date: Oct. 16, 2003

(65) Prior Publication Data

US 2005/0152831 A1    Jul. 14, 2005

(30) Foreign Application Priority Data

Apr. 11, 2002    (JP) .............................. 2002-108801

(51) Int. Cl.
*C01D 15/00*    (2006.01)
*C01D 15/02*    (2006.01)

(52) U.S. Cl. .............................. 423/594.15; 423/594.4; 423/594.6; 423/599; 423/49; 423/138; 423/179.5

(58) Field of Classification Search ............. 423/593.1, 423/594.4, 594.6, 599, 594.15, 49, 138, 179.5
See application file for complete search history.

(56) References Cited

U.S. PATENT DOCUMENTS

2002/0110518 A1* 8/2002 Okuda et al. ................ 423/594

2005/0053545 A1* 3/2005 Liu et al. ................ 423/594.15

FOREIGN PATENT DOCUMENTS

| JP | 5-198301 | 8/1993 |
| JP | 11-185754 | 7/1999 |
| JP | 2000-143246 | 5/2000 |
| JP | 2000-281349 | 10/2000 |
| JP | 2001-307729 | 11/2001 |

OTHER PUBLICATIONS

English translation of JP 11-185,754 A published Jul. 9, 1999.*
English translation of JP 2000-143,246 A published May 23, 2000.*
English translation of JP 2000-281,349 A published Oct. 10, 2000.*
English translation of JP 2001-307,729 A published Nov. 2, 2001.*
English translation of JP 05-198,301 A published Aug. 6, 1993.*

* cited by examiner

*Primary Examiner*—Timothy C. Vanoy
(74) *Attorney, Agent, or Firm*—Flynn, thiel, Boutell & Tanis, P.C.

(57) ABSTRACT

A lithium-containing complex oxide exhibits a high performance as a cathode active material of a lithium secondary cell or the like and having a high tap density. A granular lithium-containing complex oxide, such as lithium manganese complex oxide, is made up of "complex oxide grains produced by integrating lithium-rich material grains abnormally grown during a firing reaction with the surfaces of the base grains by sintering." The number of complex oxide grains is not more than 50 per gram of the complex grains. A metal oxide such as manganese oxide and lithium carbonate not more than 5 μm in average grain size are mixed by means of a mixer which grinds and mixes particles by using a shearing force and heated and fired at a warming rate of not more than 50° C./h., thus producing the lithium-containing complex oxide.

6 Claims, 2 Drawing Sheets

LITHIUM-CONTAINING COMPLEX OXIDE
AND METHOD OF PRODUCING SAME

TECHNICAL FIELD

The invention relates to lithium-containing complex oxides having a high tap density and suitable for use in a lithium secondary battery, and so forth, and a method of producing them.

BACKGROUND TECHNOLOGY

A lithium secondary battery, which has lately been in rapidly increasing demand, comprises three basic elements, namely, a cathode, an anode, and a separator holding an electrolyte interposed between the cathode and the anode.

The cathode is made of a current collector, such as a metal foil, metal mesh and so forth, and coated with a slurry prepared by mixing an active material, an electro-conductive material, a binding agent, and a plasticizer, where necessary, in a dispersive medium.

Incidentally, for a cathode active material, a lithium-cobalt complex oxide ($LiCoO_2$) has mainly been used.

However, disadvantages of using cobalt (Co) as the raw material of the cathode active material from the aspects of cobalt resources, and its higher price have recently become a concern, so that attention is being focused on the use of cheaper cathode materials such as lithium-manganese complex oxide ($Li_xMn_2O_4$) and lithium-nickel complex oxide ($LiNiO_2$).

The lithium-manganese complex oxide ($Li_xMn_2O_4$) among others has been regarded as a preferable material for use as the cathode active material of the lithium secondary battery because its discharge voltage is high and the thermal stability in the charging state is relatively high.

In general, the lithium-manganese complex oxide ($Li_xMn_2O_4$) is synthesized by sintering a mixture of electrolytic manganese dioxide, chemical manganese dioxide, or a manganese oxide, such as $Mn_2O_3$, $Mn_3O_4$, obtained by applying heat treatment to the former, with a lithium compound (lithium carbonate, and so on) at a predetermined mixing ratio.

However, there has been pointed out a problem of the conventional lithium-manganese complex oxide ($Li_xMn_2O_4$) when it is used as the cathode active material of the lithium secondary battery that cycle characteristics (particularly cycle characteristics at a high temperature) are not satisfactory.

To solve such a problem, a new method of producing a lithium-manganese complex oxide has been proposed in JP-2000-281349A, which states that manganese oxide not more than 10 μm in median grain size obtained, by a process comprising the steps of applying heat treatment at a temperature in a range of 400 to 800° C. to manganese carbonate, for example, spherical in grain shape, in an atmosphere with an oxygen concentration less than 15%, and applying heat treatment again at a temperature in a range of 530 to 800° C. in an atmosphere with an oxygen concentration not less than 15%, is mixed with a lithium compound (lithium carbonate, and so on) to be subsequently sintered.

Further, in JP-2000-281349A, it is described that a lithium-manganese complex oxide with the chemical composition represented by $Li_xMn_2O_4$ ($1.0 \leq x \leq 1.2$), spherical in grain shape, and not more than 10 μm in medial grain size, having a tap density of not less than 1.8 g/cm$^3$, can be obtained by the method proposed as above, and if the lithium-manganese complex oxide described above is used as the cathode active material of a lithium secondary battery, a lithium secondary battery having fully satisfactory cycle characteristics, even at a high temperature, can be implemented.

However, as a result of further studies conducted by the inventors, it has been found out that a lithium-manganese complex oxide sufficiently high in tap density cannot be obtained occasionally, even by the method disclosed in JP-2000-281349A, and it is therefore not possible to fully dispel apprehensions for adverse effects on the coating properties thereof against the current collector of the lithium secondary battery, and for a possibility that this might turn out to be a factor for blocking further enhancement of the performance of the lithium secondary battery.

In view of the above, it is an object of the invention to establish means for stably providing a lithium-containing complex oxide which is high in tap density and capable of exhibiting satisfactory performance as the cathode active material of a lithium secondary battery.

DISCLOSURE OF THE INVENTION

The inventors have continued further studies, and have succeeded in obtaining the following knowledge.

For the synthesis of a lithium-manganese complex oxide, there has thus far been adopted a method whereby manganese oxide is basically mixed with a lithium-containing raw material smaller in grain size than the manganese oxide, lithium carbonate is normally used, and because of the ease in production of fine raw material grains, and needs for ensuring homogeneity of sintered products, lithium carbonate smaller in grain size than the manganese oxide is used at a predetermined ratio, and a sintering (firing) processing is applied to a mixture as obtained. In the case of mixing the manganese oxide with the lithium-containing raw material, the lithium-containing raw material smaller in grain size tends to be unevenly distributed in the state of secondary particles as the agglomerations of primary particles, resulting in the un-uniformity of the ratio of the lithium and manganese. The higher lithium-containing regions undergo transformation into lithium-rich material grains, which are prone to become abnormally grown grains, even after being sintered.

The heating rate in the sintering process also affects the formation of the lithium-rich abnormally grown grains. Especially, a heating rate higher than 100° C./h causes the formation of abnormally grown grain remarkably.

Lithium-manganese complex oxide grains having a surface condition as shown in FIG. 1 cause the decrease of tap density and the deterioration of battery characteristics.

According to the result of examinations conducted on lithium-manganese complex oxides produced by conventional methods, it has become evident that as many as 100 pieces of lithium-manganese complex oxide grains comprising abnormally grown grains that are transformed from the lithium-rich material grains and are sintered and integrated therewith are present per 1 gram of specimen.

The formation of the abnormally grown grains has occurred in the case of not only producing the lithium-manganese complex oxide, but also producing other lithium-containing complex oxides such as lithium-cobalt complex oxide ($LiCoO_2$) lithium-nickel complex oxide ($LiNiO_2$), and so forth.

Nevertheless, when the lithium-containing complex oxide is produced by mixing a metal oxide such as manganese oxide, cobalt oxide, or nickel oxide, and so forth, with a lithium-containing raw material such as lithium carbonate, and so forth, to be subsequently sintered together, if the lithium-containing raw material, as small as possible in grain size, is used while the raw materials are mixed by a mixer of a type for grinding and mixing the raw materials by a shearing force (for example, a rotary blade type mixer shown in FIG. 2, and so forth), instead of by a mixer in common use, at the time of a mixing processing of the lithium-containing raw material with the metal oxide, secondary particles, if any, of the lithium-containing raw material, formed during the mixing processing, are ground by the shearing force of the mixer to be turned back into the primary particles, and in addition, the lithium-containing raw material kept in minute grain size is fully mixed with the metal oxide to be thereby adhered to the surfaces of the metal oxide grains as if the former were rubbed thereto, so that the formation of the abnormally grown grains otherwise prone to be formed on the surface of the lithium-containing complex oxide after the sintering processing, due to the formation of the secondary particles of the lithium-containing raw material, can be effectively suppressed.

Further, in addition to the above-described means, if the reaction speed is checked by keeping the warming rate at the time of the sintering processing not higher than 50° C./h, the formation of the abnormally grown grains, due to excessive advances in reaction, can be suppressed, due to which, together with the effect of application of the lithium-containing raw material minute in grain size, localized abnormally grown grains otherwise prone to be formed on the surface of the lithium-containing complex oxide after the sintering processing will hardly be observed.

Furthermore, as a result of examinations conducted to find out the effects of the lithium-containing complex oxide grains comprising the abnormally grown grains transformed from the lithium-rich material grains, and sintered and integrated therewith, on tap density and coating properties thereof against the current collector of a lithium secondary battery, it has become evident that if the number of the lithium-containing complex oxide grains comprising the abnormally grown grains transformed from the lithium-rich material grains, and sintered and integrated therewith that are present per 1 gram of the lithium-containing complex oxide are found at a ratio not more than 50 pieces, any adverse effect resulting therefrom will hardly be observed.

The invention has been developed based on the above-described items of the knowledge, and so forth, providing lithium-containing complex oxides, and a method of producing them, as follows:

(1) A lithium-containing complex oxide comprising complex oxide grains produced by causing lithium-rich material grains to be sintered and integrated with the respective surfaces of base grains, wherein the number of the complex oxide grains comprising the lithium-rich material grains that have abnormally grown during the firing reaction to be sintered and integrated with the respective surfaces of the base grains is at a ratio of not more than 50 pieces per 1 gram of the complex oxide grains.

(2) The lithium-containing complex oxide according to item (1) as above that may be a lithium-manganese complex oxide.

(3) The lithium-containing complex oxide according to items (1) or (2) as above, wherein its tap density is preferably not less than 1.8 g/cm$^3$.

(4) A method of producing a lithium-containing complex oxide by mixing a metal oxide with lithium carbonate, as raw materials, to be sintered together. This method comprises the steps of mixing the raw materials by means of a mixer for grinding and mixing by a shearing force and executing sintering at a warming rate of not more than 50° C./h in which lithium carbonate not more than 5 μm in average grain size is used.

(5) The method of producing a lithium-containing complex oxide according to item (4) as above, wherein the metal oxide as the raw material for sintering is preferably a manganese oxide.

(6) The method of producing a lithium-containing complex oxide according to item (5) as above, wherein the manganese oxide as the raw material for sintering is preferably a manganese oxide composed of fine grains not more than 10 μm in median grain size.

BEST FORM FOR CARRYING OUT THE INVENTION

The invention comprises a lithium-manganese complex oxide $\{Li_xMn_2O_4(1.0 \leq x \leq 1.2)\}$, lithium-cobalt complex oxide ($LiCoO_2$), and lithium-nickel complex oxide ($LiNiO_2$), and so forth as a lithium-containing complex oxide. If "complex oxide grains comprising lithium-rich material grains, abnormally grown during a firing reaction, and sintered and integrated with the respective surfaces of base grains" are present in the lithium-containing complex oxide at a ratio in excess of 50 pieces per 1 gram of the complex oxide, it becomes difficult to stably obtain a sufficiently high tap density (tap density not less than 1.8 g/cm$^3$), leading to disadvantageous results in respect of, for example, coating property thereof against a current collector of a lithium secondary battery, and the performance (the cycle characteristics at a high temperature) of the lithium secondary battery to which the lithium-containing complex oxide is applied.

As described in JP-2000-281349A, it has already been confirmed that if the lithium-containing complex oxide composed of fine grains (for example, not more than 10 μm in median grain size) spherical in grain shape, exhibiting a high tap density not less than 1.8 g/cm$^3$, is used for the cathode active material of a lithium secondary battery, a lithium secondary battery having fully satisfactory cycle characteristics, even at a high temperature, can be implemented.

Figure 1:
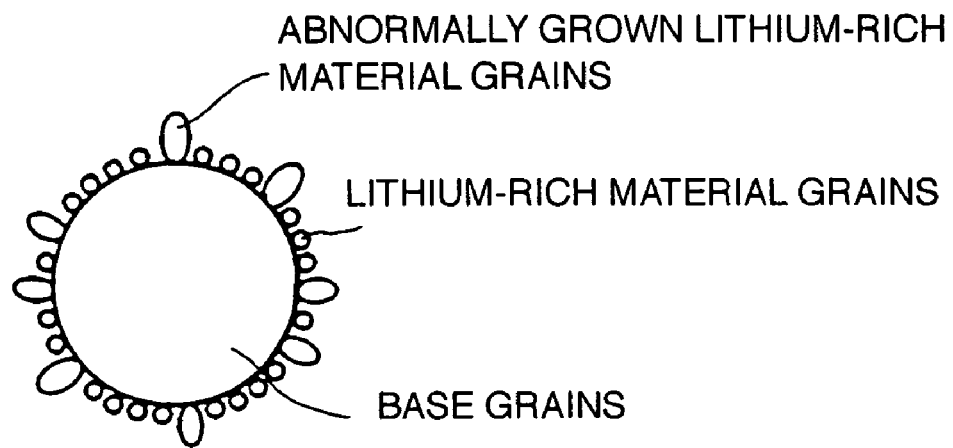
FIG. 1 is a schematic illustration showing a lithium-containing complex oxide grain comprising abnormally-grown lithium-rich-material grains sintered and integrated with the surface of a base grain.
Figure 2:
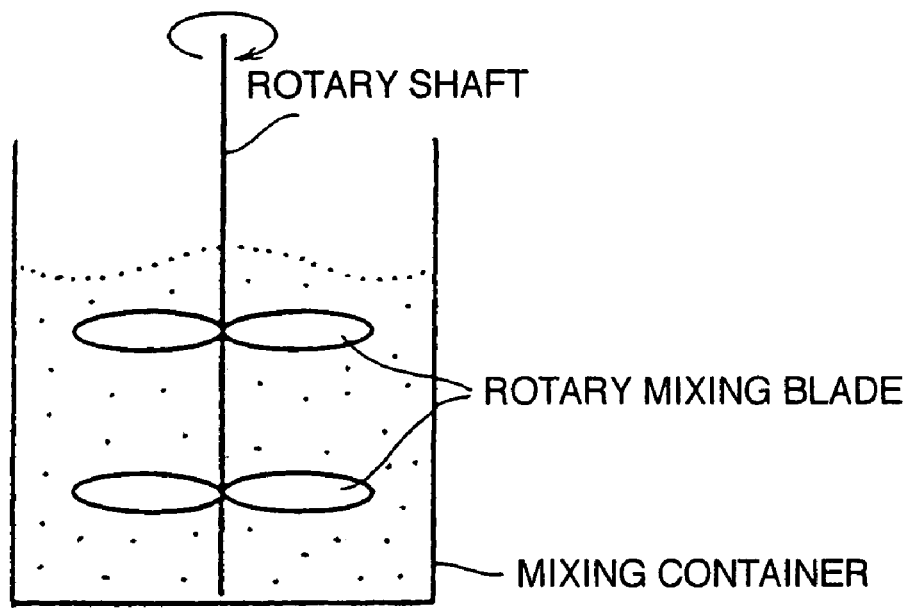
FIG. 2 is a schematic illustration of a rotary blade type mixer.
Figure 3:
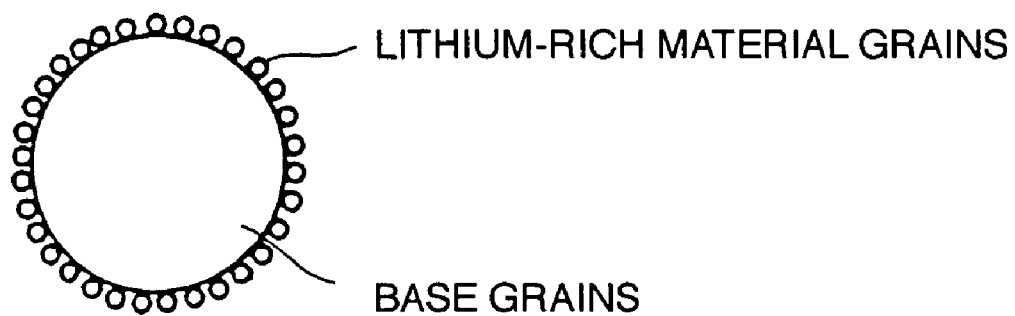
FIG. 3 is a schematic illustration showing a lithium-containing complex oxide in which the abnormally-grown lithium-rich-material grains are not present.

Incidentally, the base grains described above represent particles composed mainly of a metal oxide (manganese oxide, cobalt oxide, or nickel oxide, and so forth) serving as a sintering material and by a method of producing a lithium-containing complex oxide according to the invention, there can be obtained the lithium-containing complex oxide comprised mainly of lithium-containing complex oxide grains produced by uniformly covering the respective surfaces of the base grains with lithium-rich material grains which are reaction products of primary particles of a lithium-containing raw material (lithium carbonate), as a sintering material, through sintering and integration, as shown in FIG. 3.

The abnormally grown lithium-rich material grains refer to abnormally large reaction products (the lithium-rich material grains) of the lithium-containing raw material, sintered and integrated with the respective surfaces of the base grains at the time of the sintering processing in the state of secondary particles as agglomerations of the primary particles, as previously described, abnormally large reaction products (the lithium-rich material grains) developed in regions of lithium-containing raw material grains, due to excessive advances in reaction as a result of the sintering processing at a fast warming rate, and so forth. Since these can be observed as being abnormally different in size from the reaction products (the lithium-rich material grains) obtained by reaction of the primary particles of the lithium-containing material, in a normal condition, they can be easily identified by observation with a microscope, and so forth.

Now, the lithium-containing complex oxide according to the invention can be produced by use of a metal oxide, and lithium carbonate not more than 5 μm in average grain size, as raw materials, and by mixing the raw materials by means of a mixer for grinding and mixing by a shearing force before executing sintering at a warming rate of not more than 50° C./h.

For the metal oxide as the raw material, manganese oxide, cobalt oxide, or nickel oxide, and so forth can be used, however, from the viewpoint of production of the cathode active material of the lithium secondary battery, of which a further increase in demand is expected, it can be said that manganese oxide ($Mn_2O_3$, or $Mn_3O_4$) composed of fine grains (not more than 10 μm in median grain size) exhibiting a high tap density not less than 1.8 g/cm$^3$, as described in JP-2000-281351A, is a preferable raw material.

Further, lithium carbonate as the lithium-containing raw material is a material having an excellent reactivity with metal oxides besides being readily available, however, if the average grain size thereof exceeds 5 μm, there occurs deterioration in the uniform adhesion thereof, on the surfaces of metal oxide grains, at the time of a mixing processing, and a tendency to form the abnormally grown lithium-rich material grains will rapidly increase. Hence, with the method according to the invention, lithium carbonate not more than 5 μm in average grain size is used.

Further, with the method according to the invention, a mixer of a type for grinding and mixing the raw materials by a shearing force, such as a rotary blade type mixer, and so forth, at the time of the mixing processing is used.

The reason for this is because it has been found out that if a mixer in common use, such as a ball mill, is used, the secondary particles of the lithium-containing raw material are formed during the mixing processing, and are prone to form the abnormally grown lithium-rich material grains through reaction with the metal oxide as the raw material.

In contrast, in the case of executing the mixing processing by use of the mixer of the type for grinding and mixing the raw materials by a shearing force, even if the secondary particles of the lithium-containing raw material are formed during the mixing processing, the secondary particles are ground by the shearing force of the mixer, and are turned back into the primary particles. Besides, the lithium-containing raw material kept in minute grain size is fully mixed with the metal oxide to thereby exhibit the effect of adhesion thereto as if the former were rubbed against the surfaces of the metal oxide grains, so that the formation of the abnormally grown grains otherwise prone to be formed on the surface of the lithium-containing complex oxide after the sintering processing can be suppressed as much as possible.

It is appropriate to execute the sintering of the raw materials as mixed in a temperature range of 450 to 900° C. However, if a warming rate at the time of the sintering processing exceeds 50° C./h, the raw materials as mixed react with the regions of lithium-containing raw material grains in contact with manganese oxide grains, due to excessive advances in reaction, to be thereby transformed into the lithium-rich material grains, whereupon there will be an increase in a tendency that the lithium-rich material grains are turned into abnormally grown grains to be thereby sintered and integrated.

On the other hand, if the warming rate at the time of the sintering processing is kept not higher than 50° C./h, the formation of the abnormally grown grains, due to excessive advances in reaction, can be suppressed, and due to this, together with the effect of application of the lithium-containing raw material minute in grain size, localized abnormally grown grains otherwise prone to be formed on the surface of the lithium-containing complex oxide after the sintering processing are hardly observed. Hence, with the method according to the invention, the warming rate at the time of the sintering processing is set to be not higher than 50° C./h.

Hereinafter, the present invention is more specifically described with reference to the following Working Example and Comparative Example.

WORKING EXAMPLE

First, manganese carbonate having a spherical grain shape, 10.0 μm in the maximum grain size and 4.2 μm in median grain size, was prepared, and was fired at 650° C. in an atmosphere with 5% oxygen concentration for one hour. Thereafter, by changing the oxygen concentration in an atmosphere to 20%, the manganese carbonate was fired at 650° C. for an additional one hour, thereby obtaining manganese oxide ($Mn_2O_3$) having a spherical grain shape, 10.0 μm in the maximum grain size, and 4.5 μm in median grain size.

The manganese oxide ($Mn_2O_3$) in fine grains and lithium carbonate 4 μm in average grain size were mixed together by use of the rotary blade type mixer (Henshel mixer) such that a weight ratio of the former to the latter is 3.8: 1, and subsequently, sintering (firing) processing at 860° C. is applied thereto in the air for ten hours.

Further, a warming rate at the time of the sintering processing was set to 40° C./h. As a result of X-ray diffraction measurement of powders of a compound as obtained, it was confirmed that the compound was $Li_xMn_2O_4$ ($1.0 \leq x \leq 1.2$) in a single phase.

Furthermore, the lithium-manganese complex oxide ($Li_xMn_2O_4$) grains were 10.0 μm in the maximum grain size, and 4.5 μm in median grain size. The tap density was 2.15 g/cm$^3$.

Further, as a result of the observation of the shape of the lithium-manganese complex oxide ($Li_xMn_2O_4$) grains as obtained with the use of an SEM (Scanning Electron Microscope), it was confirmed that all the grains each were found to have a spherical shape, comprising uniform and microscopic lithium-rich material grains sintered and integrated with the surface of a base grain.

COMPARATIVE EXAMPLE

On the other hand, in contrast with the above, similar mixed raw materials were heated in the air up to 860° C. at a warming rate of 100° C./h as in the conventional case, and subsequently, sintering (firing) processing was applied thereto for ten hours, whereupon it was observed that the lithium-manganese complex oxide ($Li_xMn_2O_4$) as produced contained "complex oxide grains comprising abnormal grown lithium-rich material grains that were recognized on the surface of a base grain" being present at a ratio of as many as 78 pieces per 1 gram of complex oxide grains.

It was also found out that the complex oxide had a tap density of only 1.0 g/cm$^3$.

INDUSTRIAL APPLICABILITY

The invention can stably provide a lithium-containing complex oxide having a high tap density, thereby bringing about industrially useful effects such as implementation of a stable supply of the cathode active material of a lithium secondary battery having an excellent performance, and so forth.

The invention claimed is:

1. A lithium-containing complex oxide comprising spherical complex oxide grains having a tap density of not less than 1.8 g/cm$^3$ produced by causing lithium-rich material grains to be sintered and integrated with the respective surfaces of base grains, wherein the number of the complex oxide grains comprising the lithium-rich material grains that have abnormally grown during a firing reaction to be sintered and integrated with the respective surfaces of the base grains is at a ratio not more than 50 pieces per gram of the complex oxide grains.

2. The lithium-containing complex oxide according to claim 1, wherein the lithium-containing complex oxide is a lithium-manganese complex-oxide.

3. A method of producing a lithium-containing complex oxide by mixing a metal oxide with lithium carbonate, as raw materials, to be sintered together, said method comprising the steps of mixing the raw materials by means of a mixer for grinding and mixing by a shearing force and executing sintering at a warming rate of not more than 50° C./h in which lithium carbonate not more than 5 μm in average grain size is used, thereby obtaining the lithium-containing complex oxide of claim 1.

4. The method of producing a lithium-containing complex oxide according to claim 3, wherein the metal oxide as the raw material for sintering is a manganese oxide.

5. The method of producing a lithium-containing complex oxide according to claim 4, wherein the manganese oxide as the raw material for sintering is a manganese oxide composed of fine grains not more than 10 μm in median grain size.

6. The method of producing a lithium-containing complex oxide according to claim 3, wherein the mixer is a rotary blade mixer.

* * * * *